United States Patent [19]

Knowles

[11] Patent Number: 4,459,463

[45] Date of Patent: Jul. 10, 1984

[54] SOLDERING IRON HANDLE STRUCTURE

[75] Inventor: Alvis R. Knowles, Carson, Calif.

[73] Assignee: Eldon Industries, Inc., Hawthorne, Calif.

[21] Appl. No.: 255,881

[22] Filed: Apr. 20, 1981

[51] Int. Cl.³ .................. H05B 3/42; H01R 13/58; B25K 3/02

[52] U.S. Cl. .................. 219/238; 219/236; 219/227; 219/229; 219/533; 174/46; 174/135; 339/58; 339/105; 339/107; 228/51; 228/55

[58] Field of Search ............. 219/238, 236, 233, 227, 219/229, 221, 230, 237, 239, 240, 241, 533; 228/51, 52, 53, 55; 174/46, 135; 339/58, 103 R, 105, 107, 208, 97 L, 99 L

[56] References Cited

U.S. PATENT DOCUMENTS

| 786,542 | 4/1905 | Brown | 219/533 |
|---|---|---|---|
| 2,179,818 | 11/1939 | Hampton | 339/105 |
| 2,726,293 | 11/1955 | Bramming | 339/206 L |
| 2,997,684 | 8/1961 | Cole | 219/237 |
| 3,264,449 | 8/1964 | Brenner | 219/227 |
| 3,609,643 | 9/1971 | Connan | 339/97 L |

Primary Examiner—B. A. Reynolds
Assistant Examiner—Teresa J. Walberg
Attorney, Agent, or Firm—Edward D. O'Brian; K. H. Boswell

[57] ABSTRACT

A relatively inexpensive electric soldering iron and handle structure can be constructed so as to be relatively simple to assemble by utilizing cooperating holding elements within a tubular handle to form a holder. This holder serves to support or hold a socket adapted to support a heating element and a cord retainer in place within the handle. The holder is in turn held in place within the handle through the use of cooperating detent elements on both the holder and on the handle. The parts of the soldering handle structure are dimensioned so that the parts previously identified can be inserted as a unit into the handle through one end of the handle as the cord is withdrawn outwardly from the other end of the handle.

7 Claims, 8 Drawing Figures

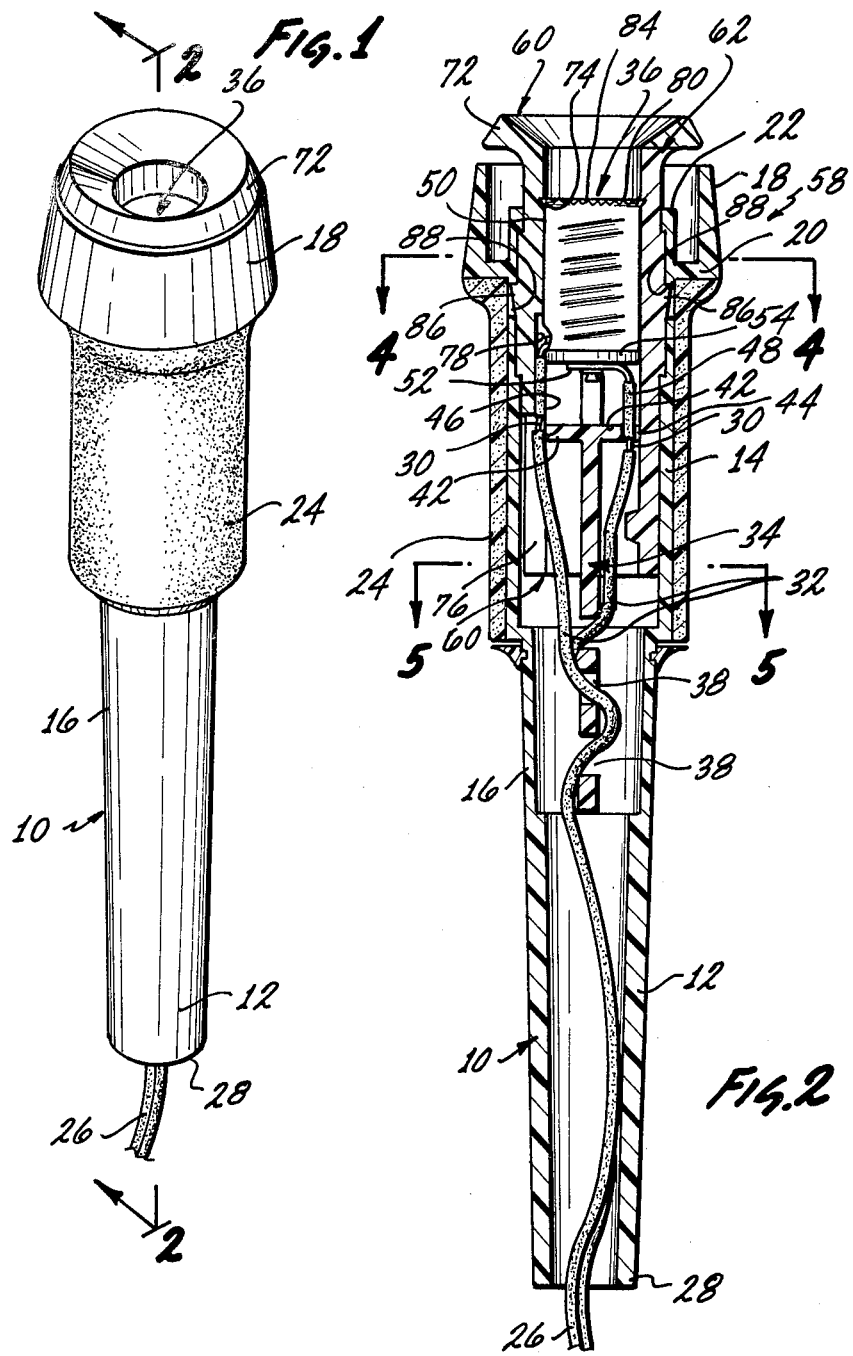

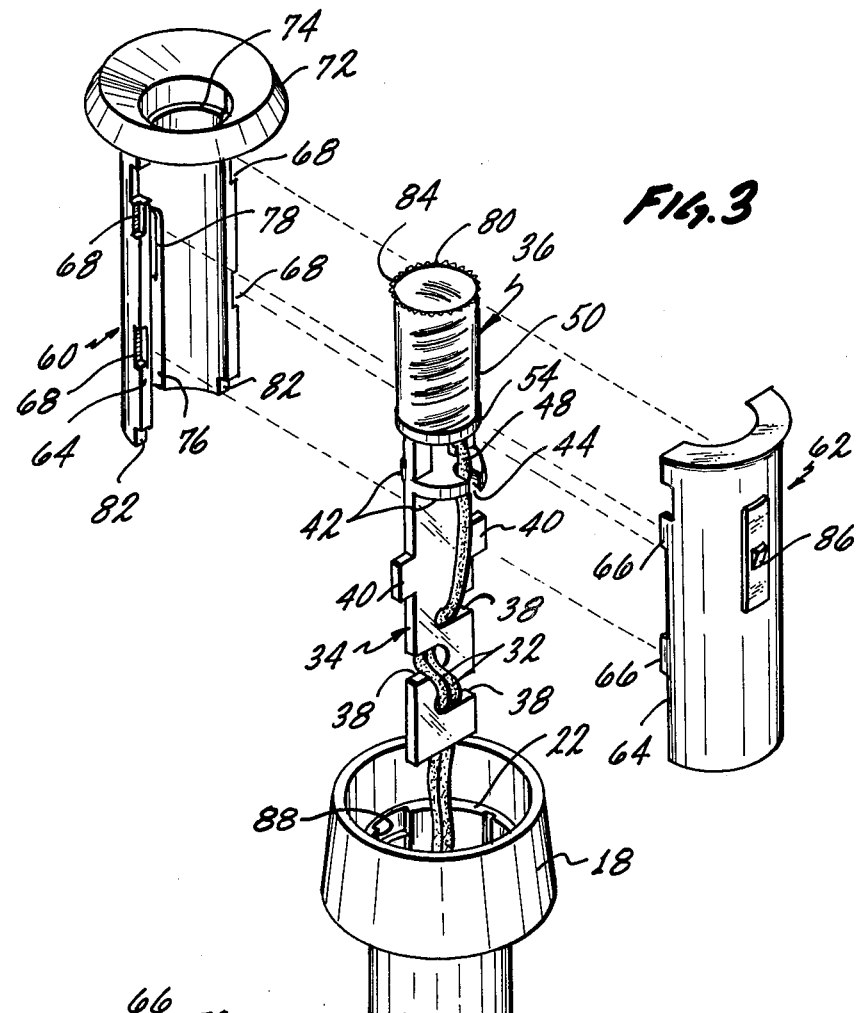
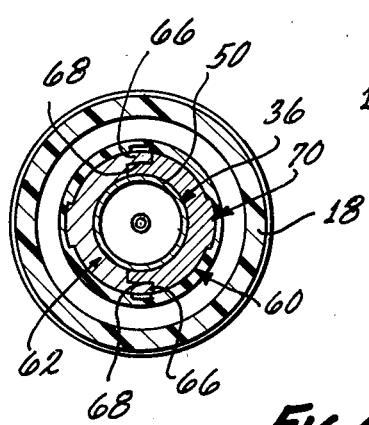
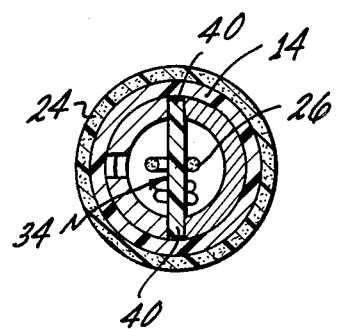

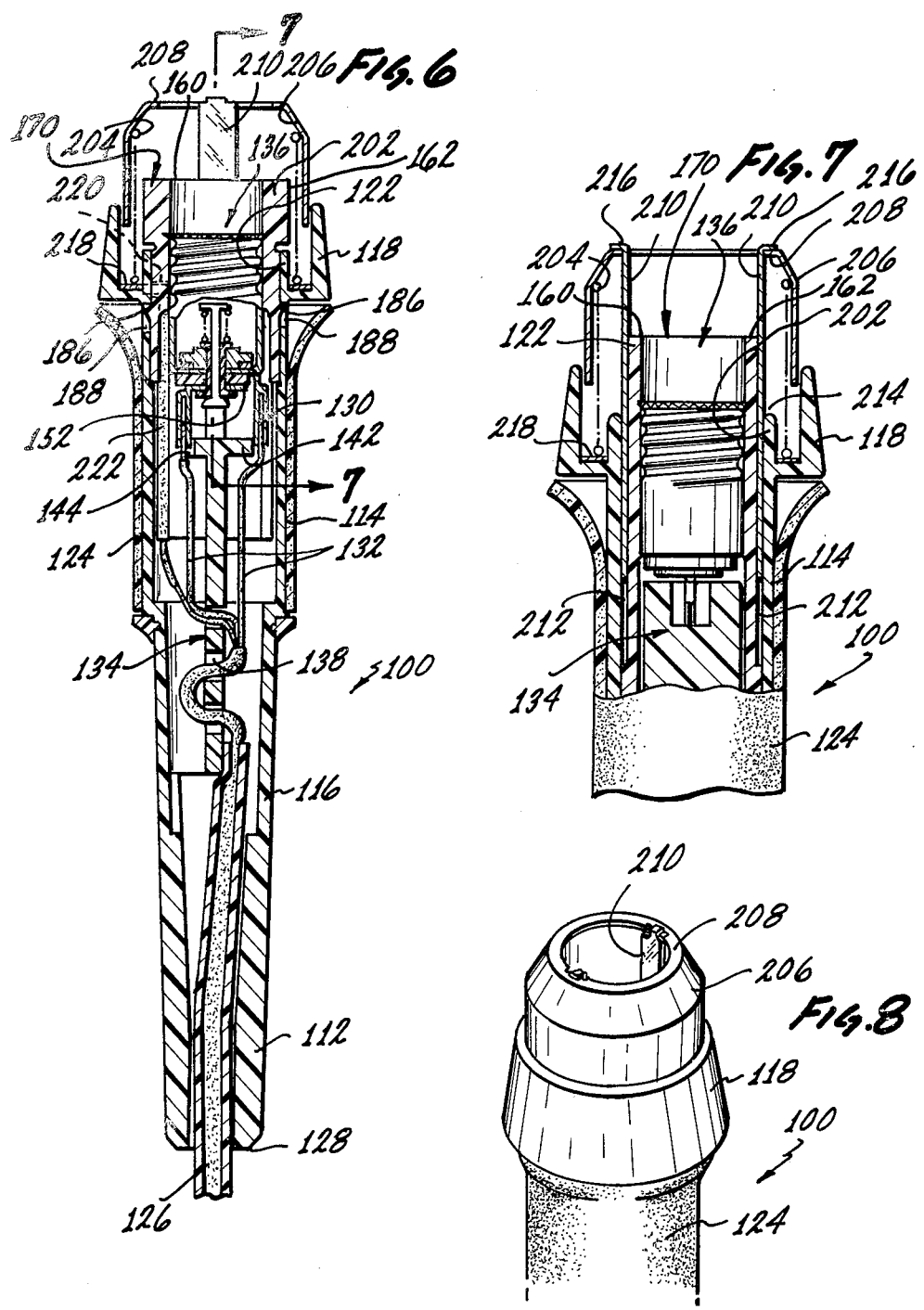

SOLDERING IRON HANDLE STRUCTURE

BACKGROUND OF THE INVENTION

The invention set forth in this specification pertains to new and improved soldering iron handle structures and more specifically to handle structures as are utilized with electrically powered soldering irons.

Such soldering irons are on occasion employed for other than soldering and desoldering operations. Thus, they may be utilized with either normal soldering tips or with various specialized tips for wood burning. Occasionally, they are employed in sculpting various wax and wax-type compositions. On occasions they are utilized in connection with the use of thermal plastic adhesives. They are also employed for various other different diverse purposes. Because of this, the expression "soldering iron" as used in this specification is to be considered as a broad, generic expresssion designating a variety of different implements which can not only be utilized for soldering purposes but which can be utilized for a wide variety of somewhat different but related purposes.

In the past electric soldering irons have, of course, been constructed in a number of ways. The vast majority of such prior electric soldering irons are believed to have been constructed utilizing a tubular or substantially tubular handle having ends. With such structures an electric cord is used so as to extend into the interior of the handle through one end of the handle; within the handle such a cord is normally supported by a mechanical retainer which serves to prevent the cord from being pulled out of the handle and is normally connected electrically to a socket capable of being utilized to operataively hold the base portion of an electric heating element. Such an element normally carries a tip so as to receive heat from the heating element so that such heat may in turn be transferred in connection with a soldering or a desoldering operation.

Because of the fact that soldering irons are widely utilized both industrially and in homes, comparatively large numbers of such soldering irons are sold and used. Many different firms compete in connection with the sale of soldering irons. Because of this latter factor, it is considered that it is quite important for a manufacturer to be able to construct soldering irons at a relatively low cost. Two factors are of significance in connection with this. The parts employed in such soldering irons must be comparatively inexpensive to manufacture. Further, these parts must be relatively simple to assemble into a completed unit. Further, the parts employed must be shaped or constructed in such a manner that they can only be assembled together in one manner in order to make it effectively possible to utilize comparatively unskilled labor in the assembly of these hot soldering iron structures. This latter is particularly important because of the comparatively high costs of labor.

It is not considered that an understanding of the present invention requires a detailed understanding of all of the ways that soldering irons and soldering iron handle structures have been constructed in the past. Prior related soldering irons and soldering iron handle structures have unquestionably been of a utilitarian character and have been widely used. It is considered that such prior structures as a group have tended to be unnecessarily or undesirably expensive. Frequently, this is the result of the costs of the components employed in such structures. Frequently, the labor costs involved in the manufacture or assembly of such prior structures have tended to make them undesirably expensive.

SUMMARY OF THE INVENTION

A broad objective of the present invention is to provide new and improved soldering iron handle structures. More specifically, the invention is intended to provide soldering iron handle structures which are particularly desirable in that these structures can be manufactured at a comparatively nominal cost as a result of the way the parts employed in these structures are formed and as a result of the relatively ease with which these parts may be assembled by comparatively unskilled labor. The invention is also intended to provide soldering iron structures which are quite satisfactory for their intended utilization and which may be utilized over comparatively longer periods without requiring repair.

In accordance with this invention, these objectives of the invention are achieved by providing an electric soldering iron handle structure which includes an elongated tubular handle having a cord end and a heating element end, a socket adapted to support a heating element located within said handle adjacent to said heating element, an electric cord extending into said handle through said cord end and connected to said socket within said handle and holding means for securing said socket in position within said handle adjacent to said heating element end in which the improvement comprises: cord retainer means operatively engaging said cord so as to hold said cord against physical movement relative to said retainer means, said retainer means being located within said handle between said socket and said cord end, the interior of said handle being shaped so that said retainer means is restrained against movement towards said cord end by engagement with a portion of the interior of said handle, said holding means including cooperating holding elements which fit against one another so as to form a hollow holder, said holding elements including internal clamping services for clamping said socket between said elements so as to secure said socket against movement relative to said holder, said holder being located within said handle adjacent to said heating element end, said holding elements being shaped so as to fit against said retainer means so as to prevent rotation of said retainer means relative to said holder and so as to limit movement of said retainer means generally towards said socket, cooperating detent means on said heating elements and said handle, said detent means being capable of temporary deformation so as to permit said holder, said socket and said retainer means to be inserted into said handle through said heating element end together as said cord is withdrawn from said handle through said cord end to a position in which said detent means on said handle and said holding elements engage as a result of temporary material deformation during such movement so as to secure said socket, said retainer means and said holding elements in place relative to said handle.

The expression "socket" utilized in the preceding is intended to designate not only a socket which is shaped as a conventional electric socket such as, for example, a screw-in lamp base or a bayonet base type electrical socket but is intended to designate a wide variety of different structures which, in effect, are the functional equivalents of such electrical conventional sockets. Thus, within the broad scope of this invention the word "socket" is intended to designate even such things as the terminal ends of electric heating elements which are constructed so that they can be connected or used in connecting heating elements into an electric circuit. Thus, this term "socket" as used in the preceding and subsequently is to be considered as, in effect, defining a socket part or terminal end part of a functional unit such as a heating element as well as a structure which is an electrical socket in the conventional use of the term.

BRIEF DESCRIPTION OF THE DRAWING

Because of the nature of this invention it is best more fully described with reference to the accompanying drawings in which:

FIG. 1 is an isometric view of a soldering iron handle in accordance with this invention;

FIG. 2 is a cross-sectional view at an enlarged scale taken at line 2—2 of FIG. 1;

FIG. 3 is an isometric, exploded view showing parts as are employed in the handle illustrated in the preceding figures;

FIG. 4 is a cross-sectional view taken at line 4—4 of FIG. 2;

FIG. 5 is a cross-sectional view taken at line 5—5 of FIG. 2;

FIG. 6 is a cross-sectional view corresponding to FIG. 2 of a modified soldering iron handle structure in accordance with this invention;

FIG. 7 is a partial cross-sectional view taken at line 7—7 of FIG. 6 in which a part of the soldering iron handle structure is shown in elevation;

FIG. 8 is a partial isometric view of a handle structure as illustrated in FIGS. 6 and 7;

Both of the different handle structures illustrated in the drawings can be considered as preferred embodiments of soldering iron handle structures of the present invention since these two different structures are preferred for separate purposes. Thus, for example, the handle structure illustrated in FIGS. 1-5 is preferred for use whenever it is not necessary to electrically ground the heating element employed with the handle structure. The embodiment of the handle structure shown in FIGS. 6-8 is considered preferrable for use whenever it is desirable to electrically ground the heating element employed with the handle structure through the use of a grounding flange on the element.

The invention is not to be considered as being limited to handle structures which are constructed so as to be substantially the same as the exact details of the handle structures illustrated. This is because the present invention involves essentially intangible concepts or principles as are set forth and defined in the appended claims forming a part of this specification. Those familiar with the design and construction of soldering iron handles and various related structures will realize that the concepts of this invention, as defined in these claims, can be embodied within a variety of different, diverse structures through the use or exercise of routine design skill in the field of the invention.

DETAILED DESCRIPTION

In FIGS. 1-5 of the drawing there is shown a soldering iron handle structure 10 of the present invention which utilizes an elongated, generally tubular handle 12 of an electrically non-conductive material. This handle 12 is shaped to include a centrally located, generally cylindrical section 14 which is attached to a somewhat elongated slightly conical section 16 and another generally cylindrical section 18 which is connected to the section 14 by a shoulder 20 forming a part of the section 18. Within section 18 a comparatively small, integral generally cylindrical flange 22 is located so as to appear more or less as an extension of the section 14. If desired, a sleeve 24 of a conventional material facilitating a person grasping and holding the handle 12 may be located around the section 14.

A conventional electric cord 26 extends into the handle 12 through a cord end 28 of the section 16. This cord 26 consists of two separate conductors 30, each of which is surrounded by a tubular insulating sleeve 32. The two sleeves 32 are normally integral except where they have been pulled apart as indicated in the drawings adjacent to a retainer 34 and a conventional socket 36. This retainer 34 is essentially a flat electrically non-conductive body having side slots 38 through which the cord 26 may be wound in order to create enough friction between the retainer 34 and the cord 26 so that this cord 26 cannot be pulled generally away from the retainer 34 in the completed structure 10.

This retainer 34 also includes two diamtrically opposed tabs 40 and two outwardly extending flanges 42 which are identical except for the fact that one of the flanges 42 includes a notch 44 as shown. The individual sleeves 32 (and conductors 20) are separated generally adjacent to the slot 38 closest adjacent to tabs 40 so that one of these conductors 30 extends through the notch 44 while the other of the conductors 30 extends generally around the flange 42 which does not contain the notch 44.

These two conductors 30 are attached to electrically conductive stiffeners 46 and 48 generally adjacent to the socket 36. The particular socket 36 illustrated may be referred to as being of the lamp base type and includes a threaded cylinder 50 to which the stiffener 46 is attached and a conventional bottom contact 52 to which the other stiffener 48 is attached. The cylinder 52 and the contact 42 are separated from one another by a small dielectric washer 54. It is to be understood that a wide variety of other differently constructed sockets may be utilized with the present invention. In this connection, reference is made to the last paragraph of the preceding summary of the invention.

When the socket 36 and the retainer 34 are attached to the cord 26 as indicated in the preceding, these parts form what can be referred to as a sub-assembly (not numbered) as illustrated only in FIG. 3. This unnumbered sub-assembly is normally only formed with the cord 26 projecting completely through the handle 12 so as to extend outwardly from what may be referred to as the heating element end 58 of the section 18 of the handle 12. When the unnumbered sub-assembly described has been made as indicated in the preceding discussion, this sub-assembly is used in connection with two holding elements 60 and 62.

These two elements 60 and 62 are substantially identical except as hereinafter indicated. Both of the holding elements 60 and 62 are generally of a semi-cylindrical shape. They have edges 64 formed with inter-fitting projections 66 and cavities 68. These projections and cavities 66 and 68, respectively, fit together so as to prevent longitudinal movement between the elements 60 and 62 when the edges 64 are fitted together. Preferably, these projections 66 and cavities 68 are formed so as to "snap" together in order to hold the elements 58 and 60 together as a unit. When the edges 64 are fitted in this manner, the elements 58 and 60, in effect, define a complete hollow holder 70.

The element 60 differs from the element 62 by having a hollow ring 72 located on the element 60 as shown so as to extend generally transverse to the length of the element 60. A comparatively small groove 74 is located generally between the ring 72 and the remainder of the element 60. This same element 60 also includes a longitudinally extending notch 76 and an internal groove 78 constituting an extension of the notch 76.

The ring 72 and the groove 74 are dimensioned so that a small outwardly flared flange 80 on the cylinder 50 will be fitted within the groove 74 against the ring 72 when the socket 36 is located generally between the elements 60 and 62. When the socket 36 is located in this manner, one of the conductors 30 and its attached sleeve 32 extends generally along and through the groove 76 and notch 78 so as to orient the retainer 34 generally within the holder 70 in such a manner that the tabs 40 on the retainer will fit within notches 82 formed by the side edges 64 fitting together. This particular method of construction tends to preclude twisting of the socket 36. Such twisting is further precluded by the use of a serrated edge 84 on the flange 80 which tends to bite into or engage the elements 60 and 62.

It is believed it will be obvious from the preceding that during the assembly of the complete structure 10 that another sub-assembly (not separately numbered) is created from the previously indicated, unnumbered sub-assembly which included the retainer 34, the socket 36 and the cord 26 joining these two parts. This second unnumbered sub-assembly includes, in addition to those parts indicated, the two elements 60 and 62 which when assembled together constitute the complete holder 70. When, as preferred, these elements 60 and 62 are constructed so that the projections 66 and cavities 68 snap together the holder 70 creates a sub-assembly (not numbered) which can be easily handled during the subsequent assembly of the complete structure 10.

At this point in the assembly of the structure 10 the cord 26 will normally be withdrawn through an end in the handle as the holder 70 is moved generally towards the interior of the handle 2. As this occurs, ratchet like projections 86 on the elements 60 and 62 will be moved generally towards small holes 88 in the section 14 of the handle 12 immediately adjacent to the shoulder 20. The elements 60 and 62 are dimensioned so that the holder 70 will fit closely within the section 14 and so that the projections 86 will "snap" into the holes 88 as a result of temporary material deformation as the various parts described are moved into place within the handle 12.

The projections 86 and the holes 88 may be regarded as either detents or ratchets because of this mode of operation. Preferably, the projections 86 are shaped essentially as ratchet teeth as illustrated so as to facilitate these projections 86 being snapped into the holes 88. Once they are snapped into position the complete structure 10 is assembled. When it is so assembled, the retainer 34 is limited against movement generally away from the elements 60 and 62 by fitting against the internal shoulder 90 generally separating the sections 14 and 16.

In FIGS. 6–8 of the drawings there is shown a modified soldering iron handle structure 100 in accordance with this invention which is essentially the same as the structure 10 except as hereinafter described. Because of the close relationship between the structures 10 and 100, those parts of the structure 10 which are identical or substantially identical to corresponding parts of the structure 100 are designated both in the drawings and in the remainder of this specification by the numerals previously used to designate such parts preceded by the numeral 1. Further, such identical or substantially identical parts are not separately described herein.

Within the structure 100 the ring 72 is replaced by a short cylindrical section 202 which appears more or less as a continuation of the exterior of the flange 122. A small coil spring 204 of an electrically conductive metal is located generally around the flange 122 and this section 202 so that this spring 204 will serve to bias a generally cylindrical metal grounding sleeve 206 outwardly away from the handle 112. This grounding sleeve 206 preferably includes an internally directed end flange 208 which is physically engaged by the spring 204.

This sleeve 206 fits within the section 118 so as to be movable relative to the handle 112. Movement of the sleeve 206 outwardly from the handle 112 beyond the section 118 is prevented by two elongated strap like rods 210 which are attached to the flange 208 in any convenient manner. These rods 210 extend generally along the exteriors of the holder 170 within slots 212 located in the exteriors of the elements 160 and 162. These slots 212 are provided with enlarged ends 214; the rods 210 are provided with similar enlarged ends 216 which fit within the ends 214. This construction serves to limit the amount that the spring 204 can bias the sleeve 208 outwardly from the handle 112. This construction also permits the sleeve 206 to move generally towards the handle 112 as it is utilized for grounding purposes with an appropriately constructed known heating element (not shown).

In the structure 100 the sleeve 206 is, of course, in electrical communication with the spring 204. In turn, this spring 204 rests upon an elongated electrical conductor 218 extending through an elongated groove 220 within the holder 170 generally between this holder 170 and the handle 112. A third conductor 222 forming a part of the cord 126 is connected to the conductor 218 generally within the section 114 in the conventional manner.

It will be realized from the preceding that the soldering iron handle structures 10 and 100 described herein are of such a character that the parts for these structures may be easily and conveniently manufactured at a comparatively nominal cost utilizing conventional techniques. Further, these parts are of such a nature that they may be easily and conveniently assembled together in a comparatively short time by comparatively unskilled labor. Once these handle structures 10 and 100 are assembled, they are effective for their intended purpose.

I claim:

1. In an electric soldering iron handle structure which includes an elongated tubular handle having a cord end and a heating element end, a socket adapted to support a heating element located within said handle adjacent to said heating element, an electric cord extending into said handle through said cord end and connected to said socket within said handle and holding means for securing said socket in position within said handle adjacent to said heating element end in which the improvement comprises:

cord retainer means operatively engaging said cord so as to hold said cord against physical movement relative to said retainer means, said retainer means being located within said handle between said socket and said cord end, the interior of said handle being shaped so that said retainer means is restrained against movement towards said cord end by engagement with a portion of the interior of said handle, said holding means including cooperating holding elements having edges which fit against one another so as to form a hollow holder, said holding elements including internal clamping surfaces for clamping said socket between said elements so as to secure said socket against movement relative to said holder, said holder being located within said handle adjacent to said heating element end, the edges of said holding elements are shaped so as to define at least one notch located generally between said holding elements, said retainer means includes a projection which is clamped between said holding elements within said notch when said holding elements are assembled into said holder so as to prevent rotation of said retainer means relative to said holder and so as to limit movement of said retainer means generally towards said socket, one of said holding elements includes a terminal ring located at its end closest to and adjacent to said heating element end and a groove separating a part of said ring and the adjacent portion of said one of said elements, said socket includes an outwardly extending flange located at its end closest adjacent to said heating element end, said flange being positioned in part between the end of the other side said element and said ring and in part within said groove so as to hold said socket relative to said holder, cooperating detent means on said heating elements and said handle, said detent means being capable of temporary deformation so as to permit said holder, said socket and said retainer means to be inserted into said handle through said heating element end together as said cord is withdrawn from said handle through said cord end to a position in which said detent means on said handle and said holding elements engage as a result of temporary material deformation during such movement so as to secure said socket, said retainer means and said holding elements in place relative to said handle.

2. A handle structure as claimed in claim 1 wherein:
said holding elements are generally of a semi-cylindrical shape and edges which fit together so that said holder is of a cylindrical shape,
said edges are shaped so as to interlock in order to prevent said holding elements from shifting relative to one another.

3. A handle structure as claimed in claim 1 wherein:
said flange on said socket includes a serated edge engaging said holder so as to tend to prevent movement of said socket relative to said holder.

4. A handle structure as claimed in claim 1 wherein:
there are two of said notches generally between said holding elements and there are two of said projections on said retainer means each of said projections fitting into one of said notches.

5. A handle structure as claimed in claim 1 wherein:
a conductive metal sleeve positioned generally between said holder and the interior of said handle at said heating element end,
spring means located between the interior of said handle and said sleeve so as to bias said sleeve outwardly from said handle and being in electrical communication with said sleeve,
means for limiting movement of said sleeve away from said handle, and
conductor means connecting said spring to said cord.

6. A handle structure as claimed in claim 1 wherein:
said holding elements are generally of a semi-cylindrical shape and have edges which fit together so that said holder is of a cylindrical shape,
said edges are shaped so as to interlock in order to prevent said holding elements from shifting relative to one another,
said flange on said socket includes a serated edge engaging said holder so as to tend to prevent movement of said socket relative to said holder,
there are two of said notches generally between said holding elements and there are two of said projections on said retainer means each of said projections fitting into one of said notches.

7. A handle structure as claimed in claim 6 wherein:
a conductive metal sleeve positioned generally between said holder and the interior of said handle at said heating element end,
spring means located between the interior of said handle and said sleeve so as to bias said sleeve outwardly from said handle and being in electrical communication with said sleeve,
means for limiting movement of said sleeve away from said handle, and
conductor means connecting said spring to said cord.

* * * * *